US011958637B2

(12) United States Patent
Sippel

(10) Patent No.: US 11,958,637 B2
(45) Date of Patent: Apr. 16, 2024

(54) GYROMESH SOLAR SAIL SPACECRAFT AND SAIL PANEL ASSEMBLIES

(71) Applicant: Timothy N. Sippel, Portland, OR (US)

(72) Inventor: Timothy N. Sippel, Portland, OR (US)

(73) Assignee: Geoshade Corporal, Portland, OR (US)

( * ) Notice: Subject to any disclaimer, the term of this patent is extended or adjusted under 35 U.S.C. 154(b) by 0 days.

(21) Appl. No.: 17/238,200

(22) Filed: Apr. 22, 2021

(65) Prior Publication Data

US 2022/0041302 A1 Feb. 10, 2022

Related U.S. Application Data

(60) Provisional application No. 63/013,906, filed on Apr. 22, 2020.

(51) Int. Cl.
*B64G 1/40* (2006.01)

(52) U.S. Cl.
CPC .................................... *B64G 1/407* (2013.01)

(58) Field of Classification Search
CPC .. B64G 1/407; B64G 1/244; B64G 2004/005; B64G 1/222; B64G 4/00; B64G 1/443
See application file for complete search history.

(56) References Cited

U.S. PATENT DOCUMENTS 3,848,821 A * 11/1974 Scheel .................... E04H 15/26 242/899
4,030,102 A * 6/1977 Kaplan ................ H01Q 15/161 244/172.6
5,296,044 A * 3/1994 Harvey ................... H02S 30/20 136/292
6,565,044 B1 * 5/2003 Johnson ................. B64G 1/648 244/171.5
9,150,312 B2 * 10/2015 Ellinghaus ............. B64G 1/244
2007/0045474 A1 * 3/2007 Bae ...................... B64G 1/1085 244/171.1
2007/0145195 A1 * 6/2007 Thomson ............... B64G 1/222 244/172.6
2009/0173831 A1 * 7/2009 Roseman ............... B64G 1/222 244/172.7
2009/0283132 A1 * 11/2009 Huang .................... H02S 30/20 136/245
2019/0144141 A1 5/2019 Barnes et al.
2019/0341721 A1 * 11/2019 Goff ..................... B64G 1/1078

* cited by examiner

*Primary Examiner* — Medhat Badawi
*Assistant Examiner* — Vicente Rodriguez
(74) *Attorney, Agent, or Firm* — Elliott, Ostrander & Presto, P. C.

(57) ABSTRACT

A gyromesh solar sail spacecraft having a gyromesh of solar sail panel assemblies, each with a reflective solar sail. The gyromesh of solar sail panel assemblies distributed around a hub and rim with a cable structure, the cable structure having a plurality of radial cables and plurality of circular cables, the radial cables extending from the hub linearly and the plurality circular cables encircling the hub. The solar sail panels assemblies attached to at least one of the plurality of circular cables, at least a portion of the solar sail panel assemblies attached to the circular cables by a plurality of actuators, respectively, wherein centrifugal force keeps the plurality of radial cables, plurality of circular cables, and solar sail panels extended from the rim.

14 Claims, 16 Drawing Sheets

GYROMESH SOLAR SAIL SPACECRAFT AND SAIL PANEL ASSEMBLIES

RELATED APPLICATIONS

This nonprovisional patent application claims benefit to provisional patent application 63/013,906 filed on Apr. 22, 2019.

STATEMENT REGARDING FEDERALLY SPONSORED RESEARCH

Not Applicable.

FIELD OF THE DISCLOSURE

This application relates to spacecraft. In particular, this application relates to solar sail spacecraft.

BACKGROUND OF THE DISCLOSURE

Solar radiation has been known to exert pressure or push spacecraft. Indeed, long traveling spacecraft must compensate trajectory to account for this solar pressure. Some spacecraft have taken advantage of this solar pressure and employ a solar sail to propel a cargo or payload. Such spacecraft are generally called solar sail spacecraft. Solar sail spacecraft potentially offer a means of propelling a payload without requiring onboard fuel.

Solar sail spacecraft is grouped in two main categories, rigid sails and non-rigid sails. Rigid sails spacecraft include the clipper sail, quad sail, and butterfly sail. Non-rigid sails, or spin sails, include the disk sail and heliogyro sails. Disk sail design includes a large sail membrane deployed for a hub. Heliogyro sail design has sail membranes with large length to width ratios that are symmetrically arranged about a hub.

Many solar sail spacecraft designs have been proposed, but very few have been reduced to practice. Designs targeting controlled solar sailing that have been launched, or have a proposed launch date include IKAROS, Lightsail2, NEA Scout, and Solar Cruiser. There have been a few other launches targeting deployment without attitude control, or to demonstrate use as a drag sail for deorbiting. To date, all of these are of the clipper style designs Methods to control the sail orientation, or attitude, also distinguish solar sail designs. IKAROS, NEA Scout, and Solar Cruiser use spin to help maintain attitude. IKAROS and Solar Cruiser modulate reflectivity on different areas of the sail to produce a torque to change attitude. LightSail2 and NEA Scout include momentum wheels for torque. NEA Scout also makes use of cold gas thrusters. LightSail2 is the only one of these sail craft that are able to change the sail orientation quickly enough to maneuver under a roughly 90-minute period of low earth orbit. Orbit-raising typically requires turning the sail by 90 degrees, twice per orbit. The sail is oriented towards the sun for half of the orbit, and turned 90 degrees to be edge-on to the sun for the other half of the orbit. By comparison, IKAROS required 23 hours to change its attitude by ½ degree. Without an orbit-raising ability, solar sails must be launched beyond earth orbit, or else have a high enough orbit for the orbital period to be many days.

This application relates to another approach.

SUMMARY OF THE DISCLOSURE

In one aspect, the present disclosure is directed to a solar sail foldable in a first direction and a second direction, the solar sail having a top strut and a bottom strut, both the top strut and the bottom strut foldable in the second direction, the top and bottom struts having a plurality of segments, each of the plurality segments joined by a latching hinge mechanism. The solar sail having a sail panel control module having an actuator, the actuator in physical connection with the solar sail allowing rotation of the solar sail relative to the sail panel control module. Wherein the foldable top struts have a latching hinge mechanism that allows unfolding of the plurality of segments and locks the plurality of segments in an elongated position.

In another aspect the disclosure is directed to a gyromesh solar sail spacecraft. The gyromesh solar sail space having a gyromesh of solar sail panel assemblies, each with a reflective solar sail. The gyromesh of solar sail panel assemblies distributed around a hub and rim with a cable structure, the cable structure having a plurality of radial cables and plurality of circular cables, the radial cables extending from the hub linearly and the plurality circular cables encircling the hub. The solar sail panels assemblies attached to at least one of the plurality of circular cables, at least a portion of the solar sail panel assemblies attached to the circular cables by a plurality of actuators, respectively and wherein centrifugal force keeps the plurality of radial cables, plurality of circular cables, and solar sail panels extended from the rim.

DETAILED DESCRIPTION OF THE INVENTION

Referring to the figures attached herein, methods and embodiments of the present invention are described further hereinbelow.

Figure 1:
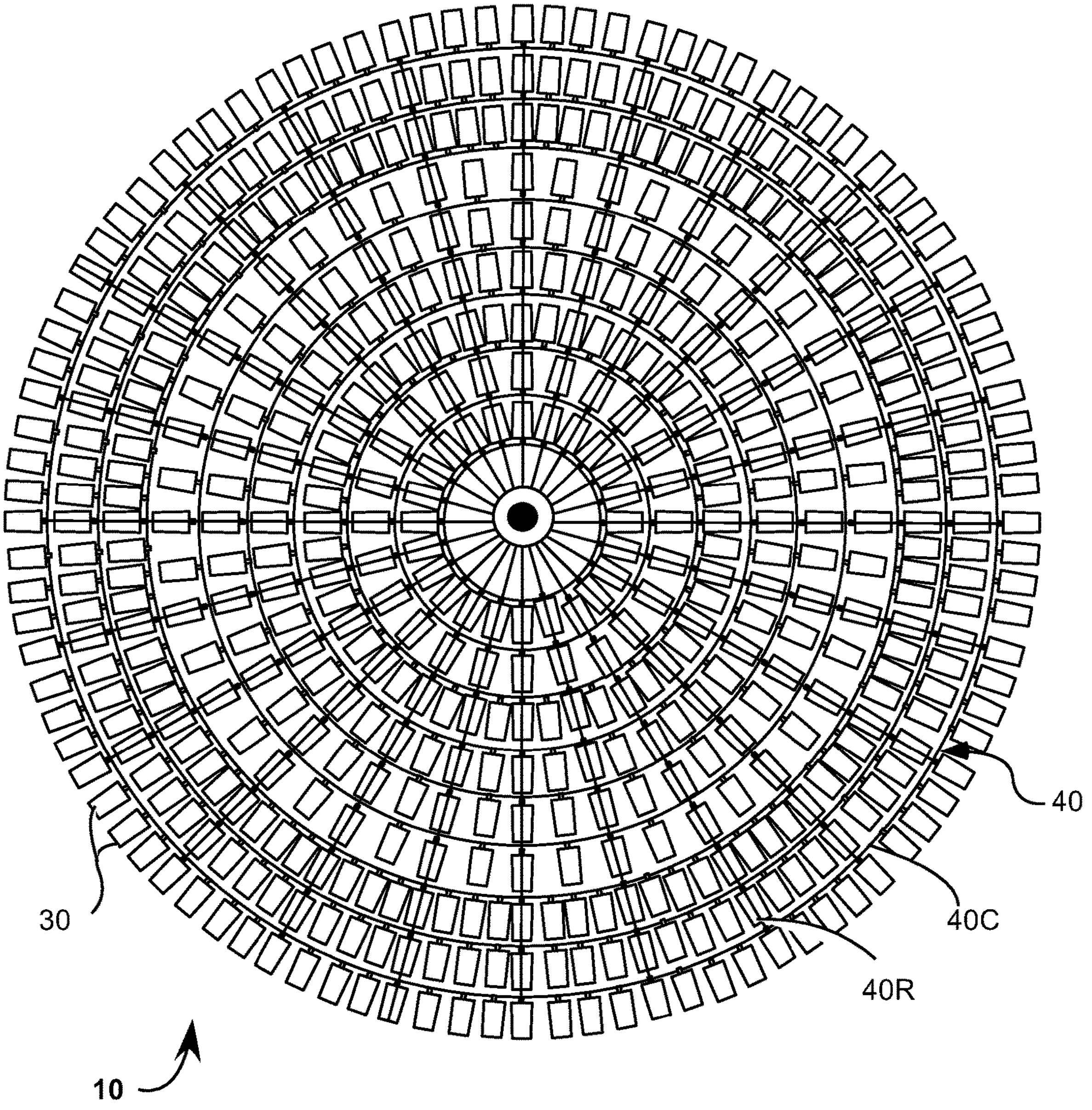
FIG. 1 is a plan view of a gyromesh solar sail spacecraft comprising a gyromesh of solar sail panel assemblies, each of the solar sail panel assemblies having a reflective solar sail. The gyromesh of solar sail panel assemblies are distributed around a hub and rim with a cable structure, the cable structure having a plurality of radial cables and plurality of circular cables, the radial cables extending from the hub linearly and the plurality circular cables encircling the hub. The solar sail panels assemblies attached to at least one of the plurality of circular cables, at least a portion of the solar sail panel assemblies attached to the circular cables by a plurality of actuators, respectively. Centrifugal force keeps the plurality of radial cables, plurality of circular cables, and solar sail panels extended from the rim.

Referring to FIG. 1, a gyromesh solar sail spacecraft 10 comprises a gyromesh of solar sail panels 30. Here, each individual of the gyromesh solar sail panels are rectangular, however any shape is possible. The gyromesh of reflective sail panels are distributed radially from a hub with a cable structure 40. The cable structure has a plurality of radial cables 40R and a plurality of circular cables 40C. The plurality of radial cables 40C extend from the hub linearly and the plurality of circular cables 40C attached to the plurality of radial cables 40R and encircle the hub. Shown in further detail in figures hereinbelow, the hub has a rigid rim from which the radial cables extend. The circular and radial cable are composed of segments of cable that are attached to one another. Each individual of the gyromesh of solar sail panels attach to a portion of at least one of the plurality of circular cables 40C either directly or via an actuator. When deployed in space, the gyromesh solar sail spacecraft spins and centrifugal force keeps the plurality of radial cables 40R, plurality of circular cables 40C, and the solar sail panels 30 extended from the hub. The gyromesh solar spacecraft 10 is controlled via communication from the hub to individual sail panel control modules. The hub can be navigationally preprogrammed or controlled via known long range communication means.

As further described hereinbelow, rotational motion is required to provide centrifugal force to facilitate deployment and operation of the gyromesh solar sail spacecraft. Rotational motion can be achieved through propellant force; such as release from the launching rocket or thrusters on the deployed spacecraft. Another method is using the solar sails themselves angled towards the sun in a fan or pinwheel orientation. Yet another method is to mechanically rotate a physical object relative to the spacecraft. The physical object could be another spacecraft and mechanical rotation relative to one another.

Figure 2B:
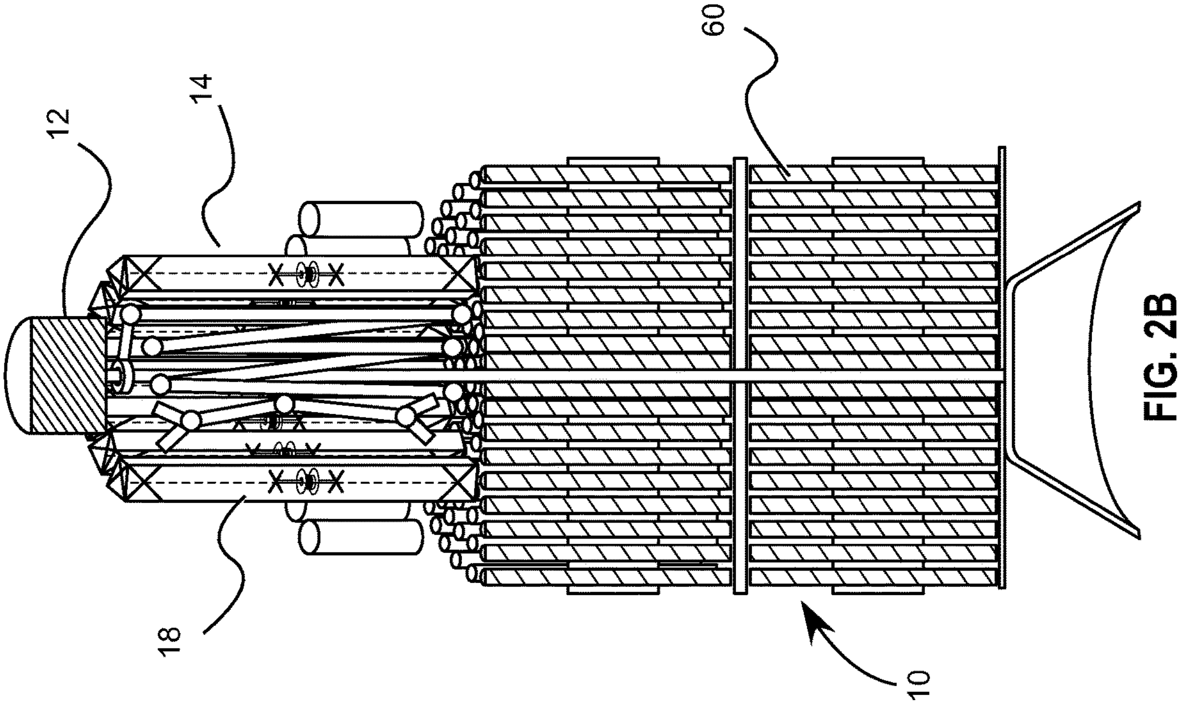
FIG. 2B is a cross-section view the components of that shown in FIG. 1, packed into the volume of a rocket faring of the shown in FIG. 2A
Figure 2A:
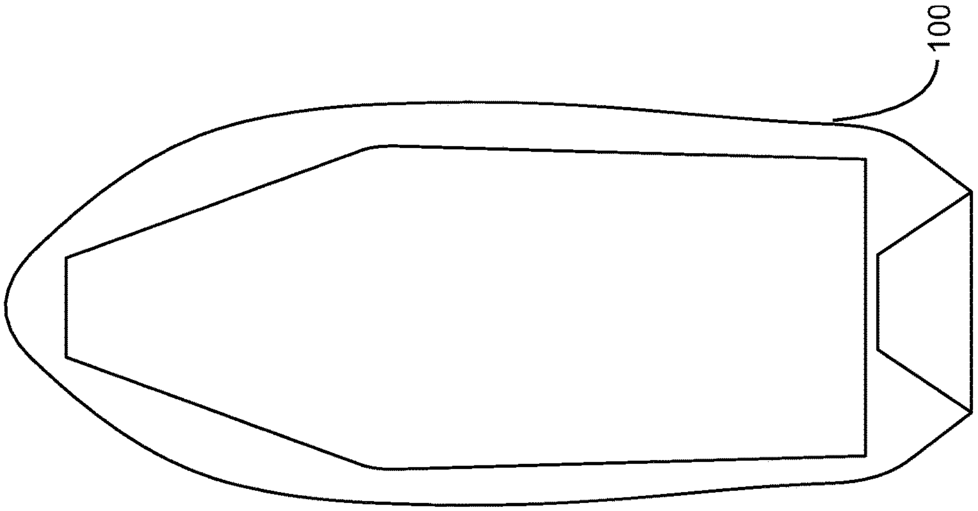
FIG. 2A is a cross-section view of single rocket faring.

In one embodiment, the gyromesh solar sail spacecraft is stowed in a single rocket payload. The payload is launched into a low earth orbit and deployed in space either remotely or in a preprogrammed sequence. Referring to FIGS. 2A and 2B, a section view illustrates a packed payload. FIG. 2A shows a section view of a rocket faring 100 that can accommodate the embodiment shown in FIG. 1. FIG. 2B shows the components of the gyromesh solar sail spacecraft 10 packable within the volume of the rocket faring 100. Once launched into orbit, the gyromesh solar sail spacecraft is deployed using simple mechanical features assisted by a robotic arm.

Figure 3A:
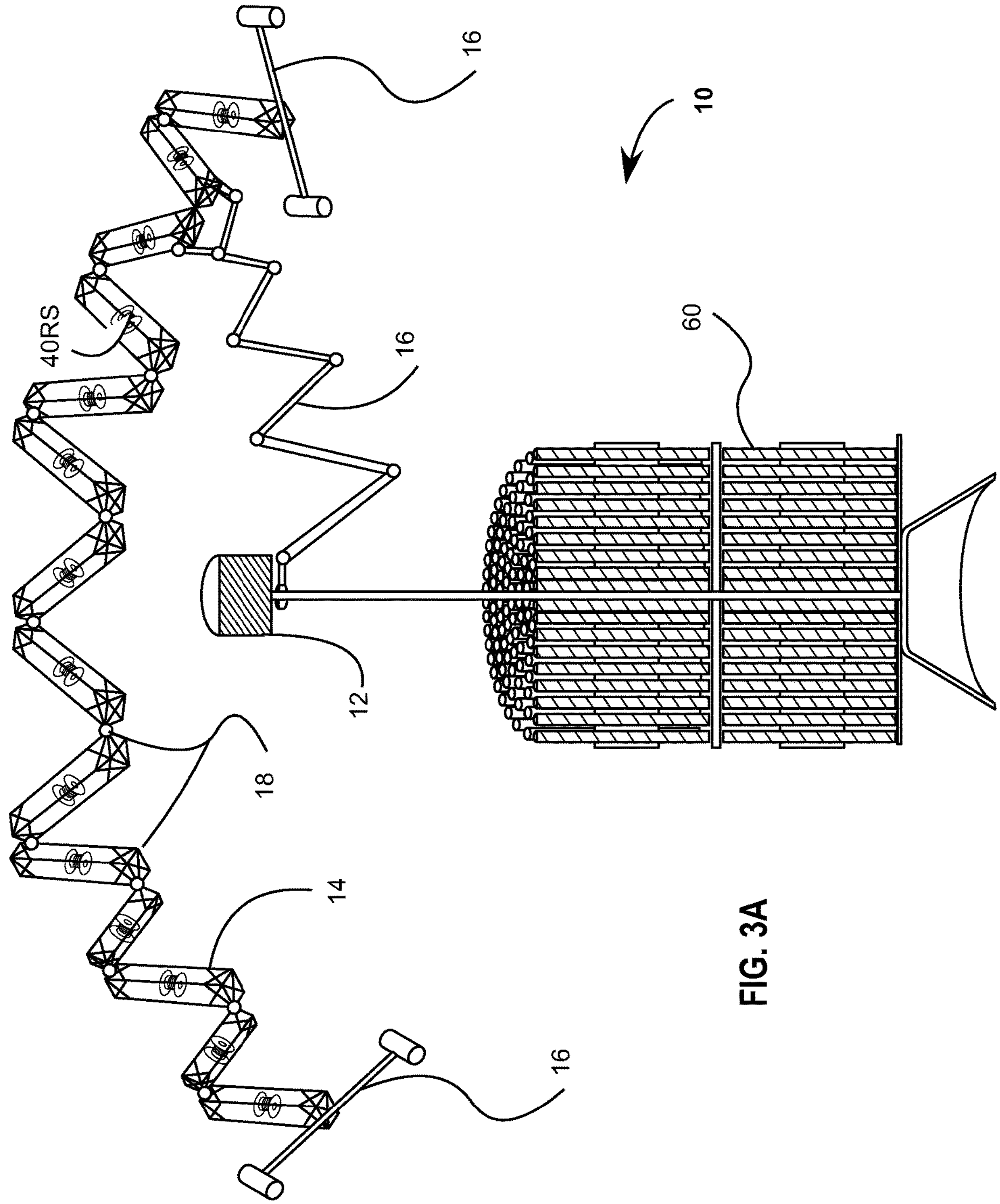
FIG. 3A is a partial perspective view of the spacecraft shown in FIG. 1, deploying the rim with a robot arm.
Figure 3B:
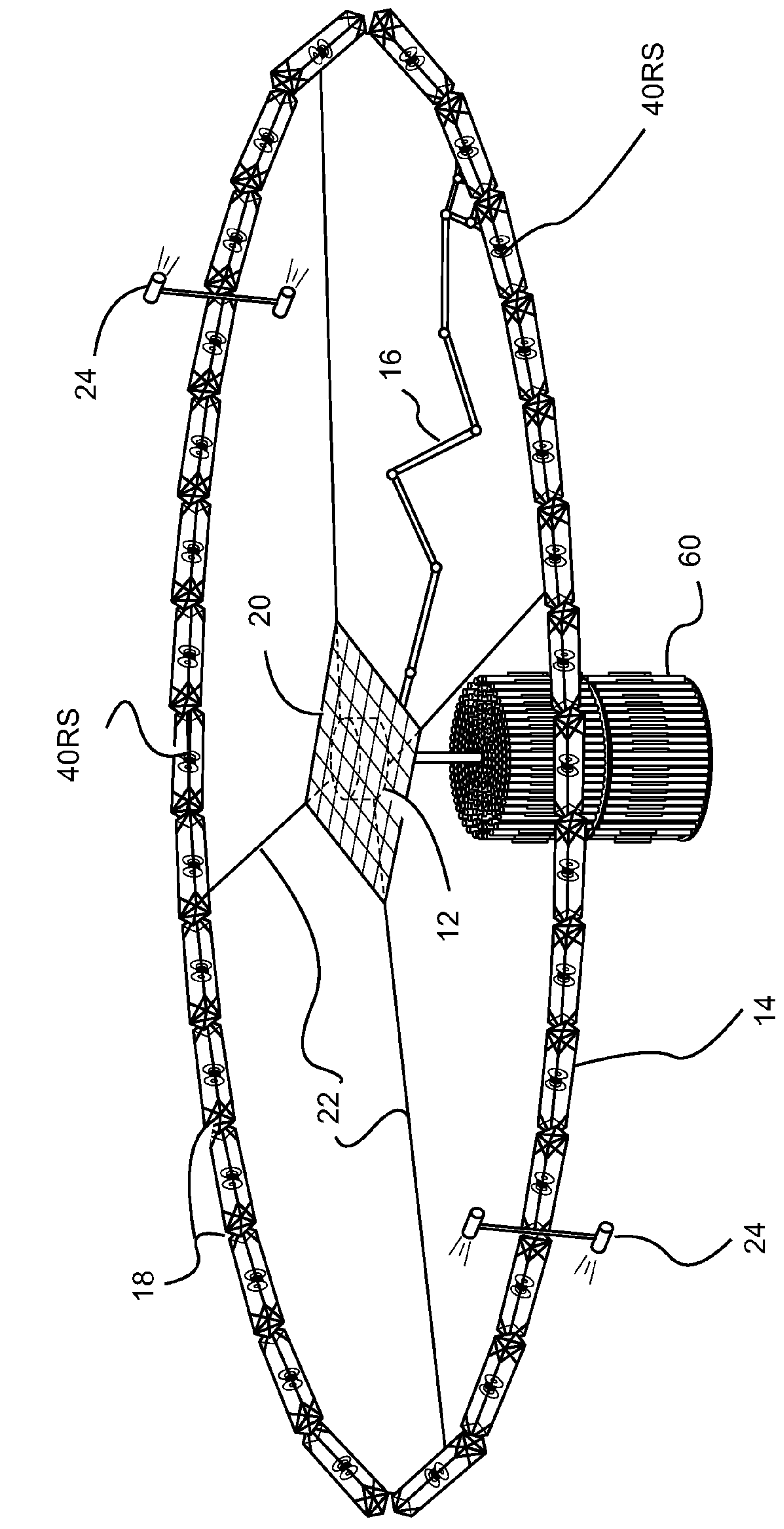
FIG. 3B is a partial perspective view of the spacecraft shown in FIG. 1, wherein the rim is deployed.

Referring to FIGS. 3A and 3B, initial deployment of the spacecraft is shown. FIG. 3A shows a partial cross-section view of the spacecraft deploying a rim 14 from a hub 12. Here, a robotic arm 16 assists assembling the rim 14 by pushing sections outward. Initial unpacking of the gyromesh solar sail spacecraft includes deploying the hub 12 and rim 14. The robot arm 16 first orients a solar cells 20 towards the sun to provide electrical energy. Then robot arm 16 begins to unfold the rim. As shown in FIG. 2B, the rim is stowed with hinged sections 18 folded and rolled and a plurality of solar sail assembly modules 60 stored below. The robot arm 16 pushes the rim sections into position and latches the hinge sections end-to-end. In one embodiment the robotic arm 16 extends to the perimeter of the rim 14. In another embodiment, the hub 12 can move within the rim using hub-to-rim cables 22. In yet another embodiment, multiple robot arms are employed to increase production and provide redundancy. Further embodiment includes combinations of the aforementioned embodiments.

Referring to FIG. 3B, hub-to-rim cables extend from the hub to the rim. Here, four hub-to-rim cables are employed. The rim cables can be held passively affixed to the hub or can be attached with motorized spools. Using motorized spools allows the hub to adjust its position within the rim to aid in assembly and navigational purposes to adjust the center-of-mass.

As mass of the solar sail craft is deployed farther away from the rim, rotational speed will decrease. A thruster 24 or thrusters can be used to increase the rotational speed. As sufficient space is available during deployment of the gyromesh, some of the sail panels can be unfurled. Those sail panels can be oriented to provide thrust from solar light pressure to increase rotational speed. The thrust from these thrusters and sail panels can also be used to control the sail craft attitude for navigation and orbit raising.

Figure 4:
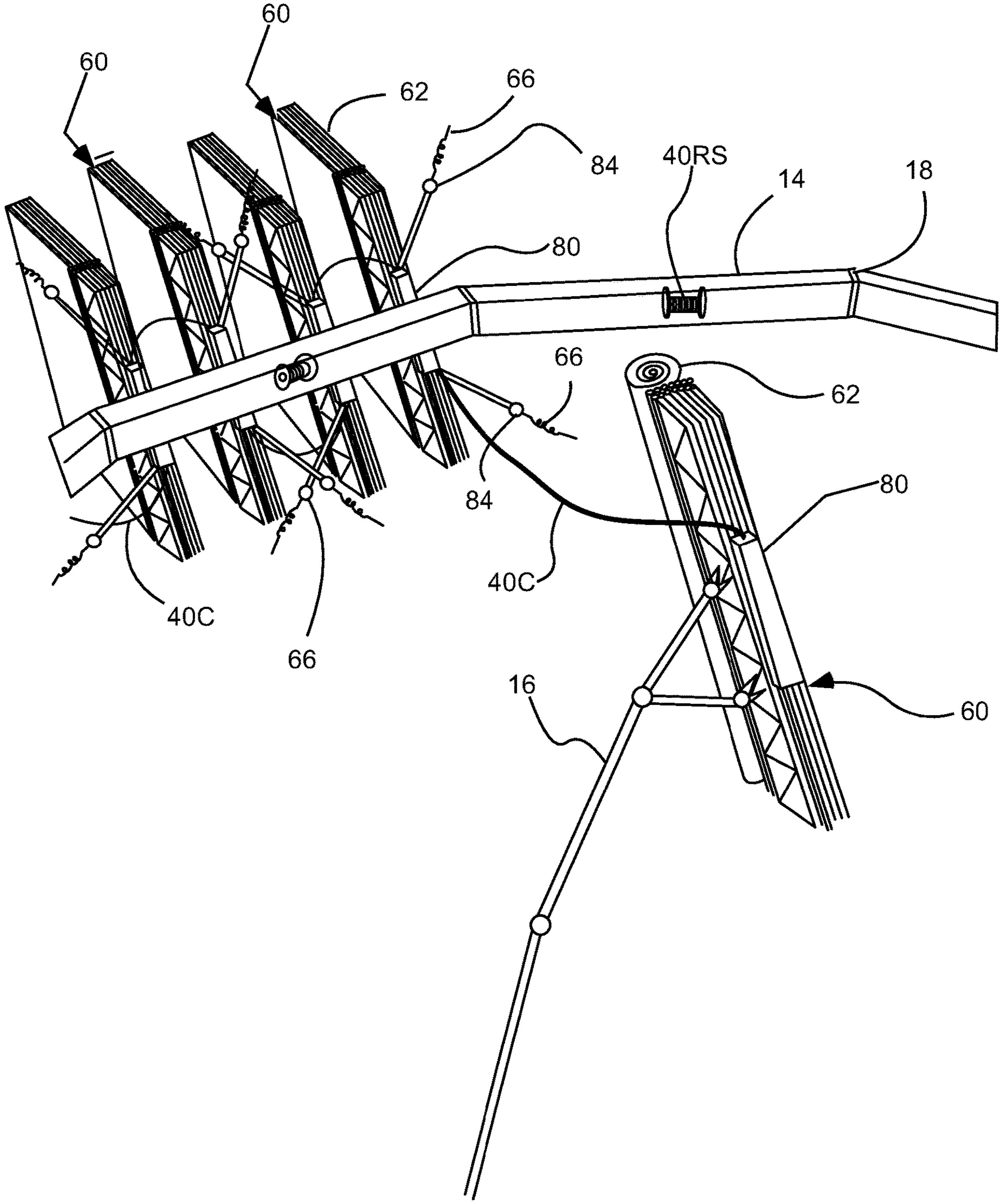
FIG. 4 is a partial view of the robot arm deploying the plurality of solar sail assemblies onto the rim.

Referring to FIG. 4, a partial view of the robot arm 16 installing solar sail assemblies 60 is shown. Here, the robot arm 16 loads the sail panel assemblies 60 onto the rim 14. The first section of the sail panel assemblies 60 on the rim become the outer most circular section of the gyromesh solar sail spacecraft as can be seen in FIG. 1. The sail panel assemblies 60 are packed with the circular cable 40C connected at their predetermined or nominal positions. Optionally, the circular cable connections can be made with the robot arm. Radial cables 40R within the rim sections are wound on radial cable spools 40RS. The robot arm 16 assists temporarily attaching all sail panel assemblies associated with the circular ring onto the rim and the radial cables. The robot arm performs some initial deployment steps on a solar sail panels 62, such as unrolling (but usually not unfolding) the solar sail panel, positioning a camera 84, antennas 66, extending a pivot arm 92, attaching and detaching various cables described further hereinbelow, and switching on power. In order to fit the solar sail panel assemblies on the rim 14, sail panel assemblies 60 are positioned in a vertical position relative to the plane or the rim 14.

While being assembled on the rim, the solar sail panels 62 typically remain in their folded position. Optionally, a number of the solar sail assemblies can unfurl their sail and deploy to steer the spacecraft or increase rotation of the spacecraft by angling the sail relative to the sun, either at the rim, at an intermediate deployment step, or combinations thereof.

Figure 5:
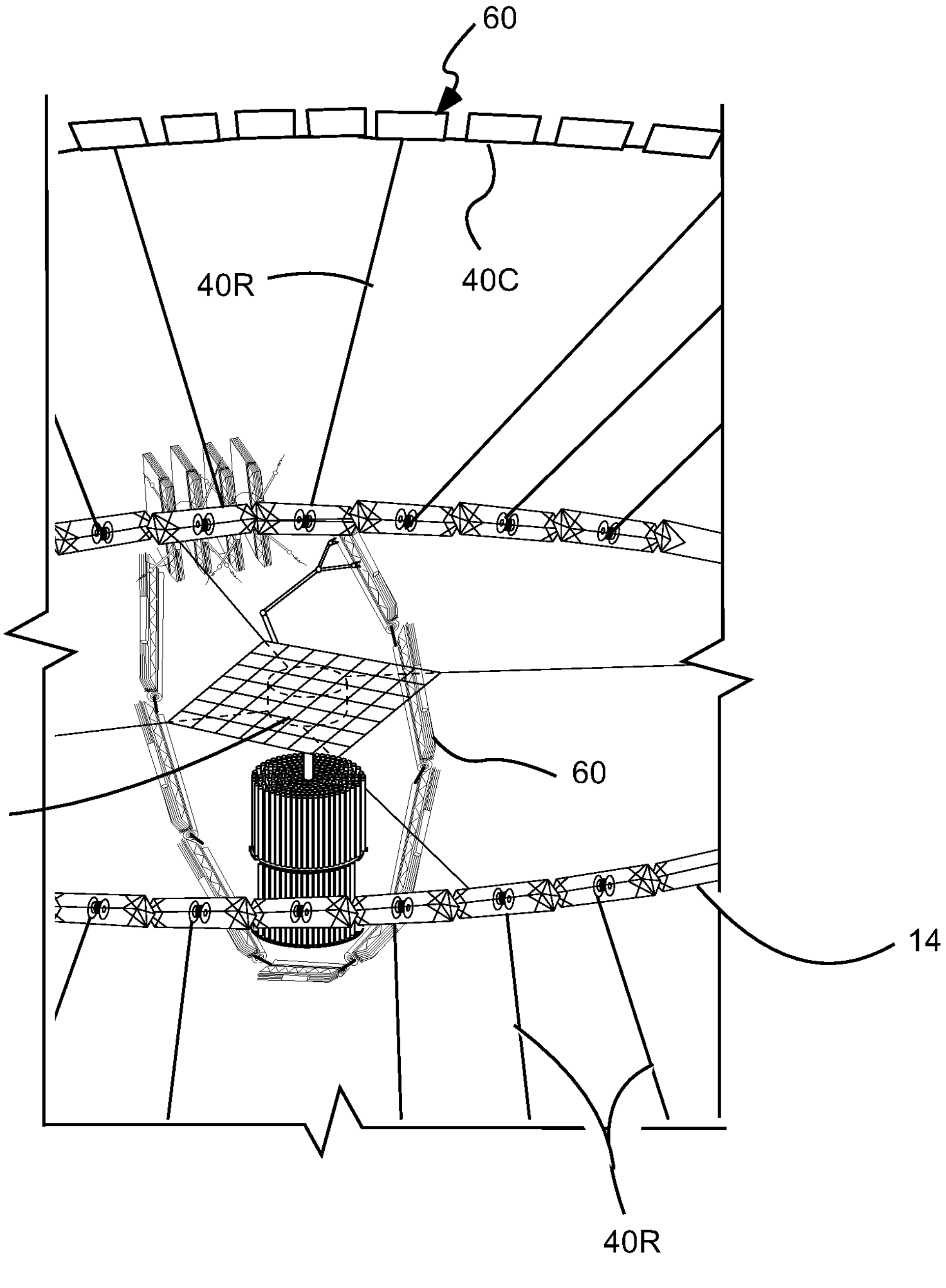
FIG. 5 is a partial view of the gyromesh solar spacecraft with a deployed circular cable section and loading of another circular cable section on the rim.
Figure 6:
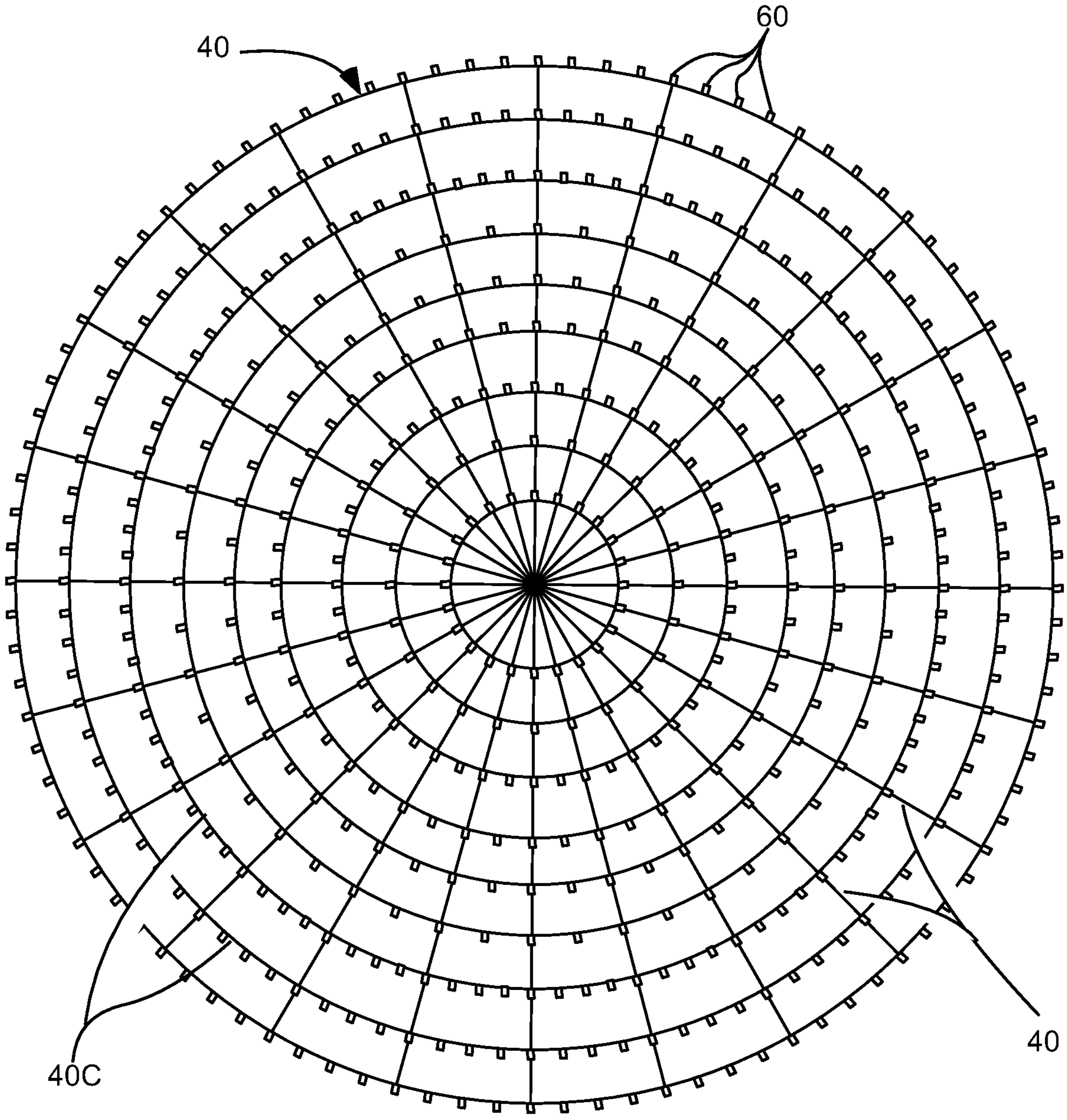
FIG. 6 is a plan view of the gyromesh solar spacecraft with the plurality of sail assemblies deployed with the solar sails not yet unfurled.

Referring to FIG. 5, a partial perspective view of the gyromesh solar spacecraft illustrating a deployed circular cable section and loading of another circular section of the plurality of circular cables 40C on the rim 14. When all the sail panel assemblies 60 for a particular circular cable are positioned on the rim 14 the plurality of radial cables 40R spool out and centrifugal force causes the sail panel assemblies 60 and plurality of circular cables 40C to extend from the hub 12 and rim 14. As the radial cables extend from the rim, the perimeter of the circular cables will increase. Tension from the circular cables will automatically cause a circular cable spool to release circular cable increasing the perimeter. Once extended from the rim 12, the robot prepares the next circular ring of sail panel assemblies 60 on the rim 12. The process is repeated for each circular ring until the gyromesh is fully deployed. FIG. 6 illustrates a fully deployed gyromesh cable structure 40 without the sail panels unfurled.

Figure 7:
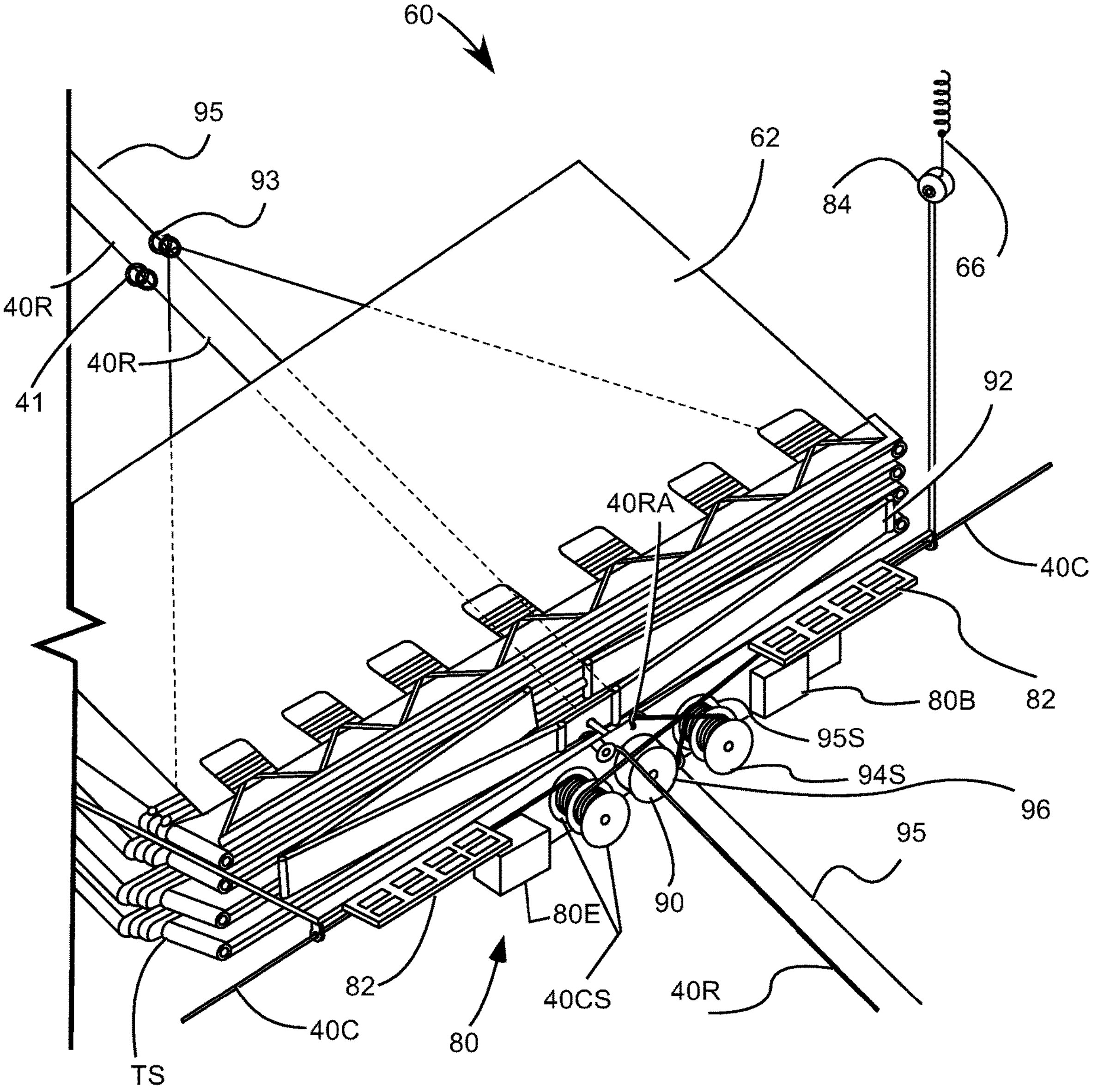
FIG. 7 is a partial perspective view of a sail panel assembly.

Referring to FIG. 7, a partial perspective view of a sail panel assembly 60 illustrates various components in further detail. The solar sail assemblies 60 include a sail panel control module 80 and a sail panel 62 joined together with a strut 92. In this embodiment, the solar panel assembly 62 has a sail panel control module 80 and related electronics 80E powered with the solar panels 82. The sail panel control module has an antenna 66 for communication to the hub. Optionally, a camera 84 is employed to monitor the solar sail panels. The solar sail control module can draw power from a solar cell 82 or a battery 80B, which in turn can be charged by solar cell 82. An actuator 90 connects to the sail via a pivot arm 92. The pivot arm, shown folded, extends the sail from the circular cable to provide clearance for the unfurled solar sail. Circular cable spools 40CS allow positioning along circular cable.

A drag cable 94 and drag spool cable spool 94S is attached to the bottom strut and allows slow deployment of the sail during unfurling. The drag cable 94 can slide through additional attachments points along the centerline of the sail membrane and struts for additional speed control during unfurling of the sail. Unfurling is described in further detail hereinbelow. The drag spool can be driven by an actuator or be passively controlled with a dampener or transmission such a spring loaded brake, drag wheel, or other such mechanism. At the same connection point shown near the bottom strut, a tension cable 95 can be attached to the bottom strut to add extra tension when the sail is deployed. At tension cable spool 95S can controls the tension cable. Wherein needed cable attachment is achieved by simple mechanical connections known in the art. Where convenient, simple lightweight carabiners are sufficient. Both the drag cable and tension cable 95 are optional.

A plurality of actuators can be used to drive each spool. Alternatively, a single actuation can be used and a switching mechanism can drive particular spools. Further, backup or redundant actuation be used to ensure functionality of any individual sail.

The solar sail panel 62 is accordion folded in a first direction and a second direction. The sail can be any shape. Here, the sail panel is rectangular and folded first along is length in the direction of the radial cable. The sail is second folded along its width. The solar sail panel 62 has at least a top strut TS and bottom strut BS that are foldable, examples of which are provided in more detail in FIG. 8A and FIG. 8B. A middle strut or further struts can be employed for structural integrity, and minimize wrinkling and billowing. The top struts have a plurality of foldable sections that are connected with a latching hinge mechanism. The middle and bottom struts are similarly foldable.

During deployment of the sail panel assemblies at the rim, the robot arm will perform several types of cable connections. If the solar sail panel is aligned with the location for a radial cable, the robot arm may be used to attach a radial cable segment from the radial cable spool on the rim to the radial cable assembly point 40RA. If a radial cable is attached to the rim from a sail panel radially further out from the current sail panel, the robot arm can disconnect the cable from the rim and connect the cable to the sail panel's bottom radial connector 41. Similarly, if a tension cable is attached to the rim from a sail panel radially further out from the current sail panel, the robot arm can disconnect the tension cable from the rim and connect the tension cable to the sail panel's bottom tension connector 93. If the next inner circle has a sail panel radially aligned with the current sail panel, the robot arm may connect the current sail panel's tension cable 95 to the rim, for subsequent connection to the next inner circle's bottom tension connector.

Figure 8A:
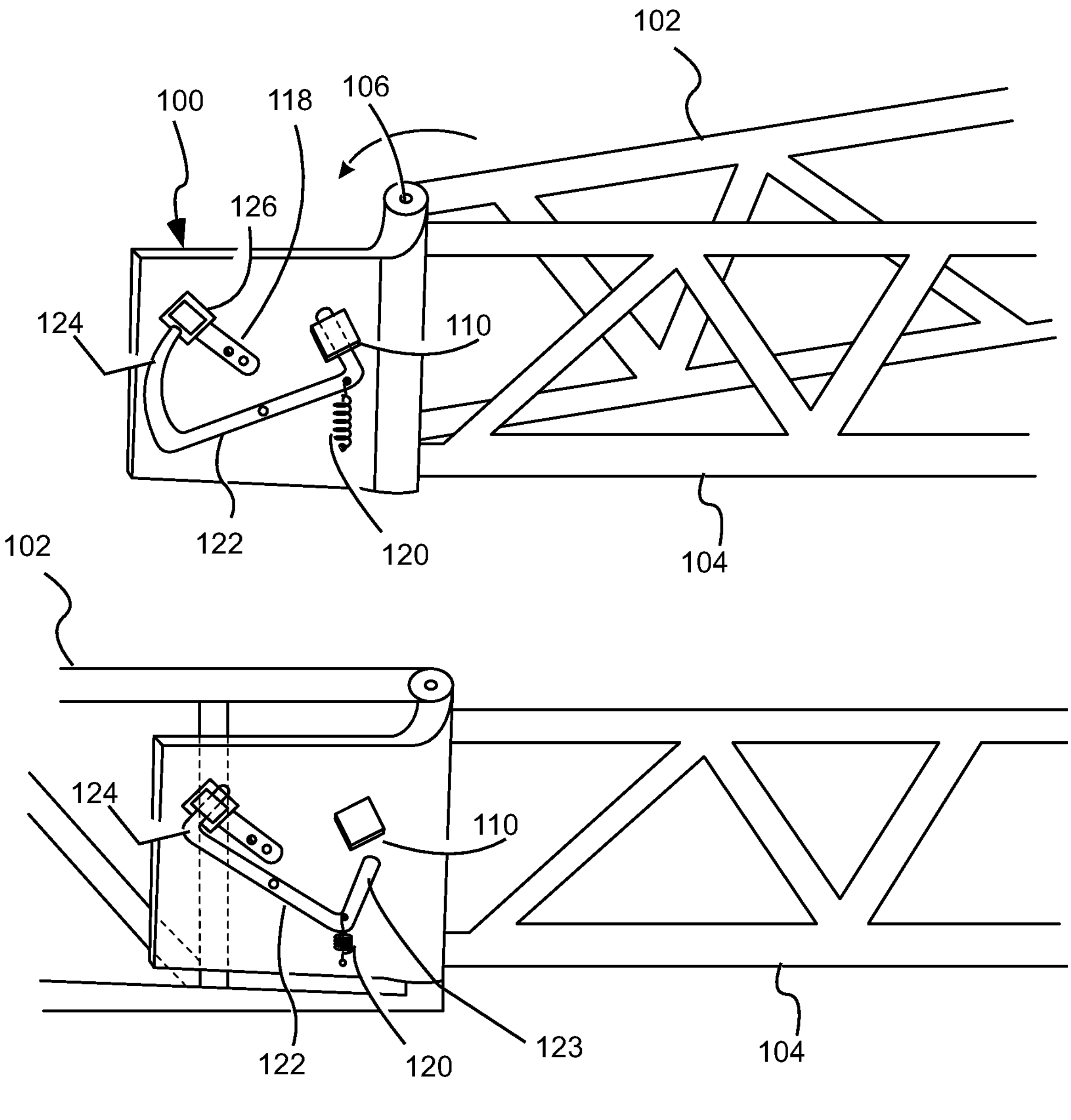
FIG. 8A is a perspective view of a latching hinge mechanism.
Figure 8B:
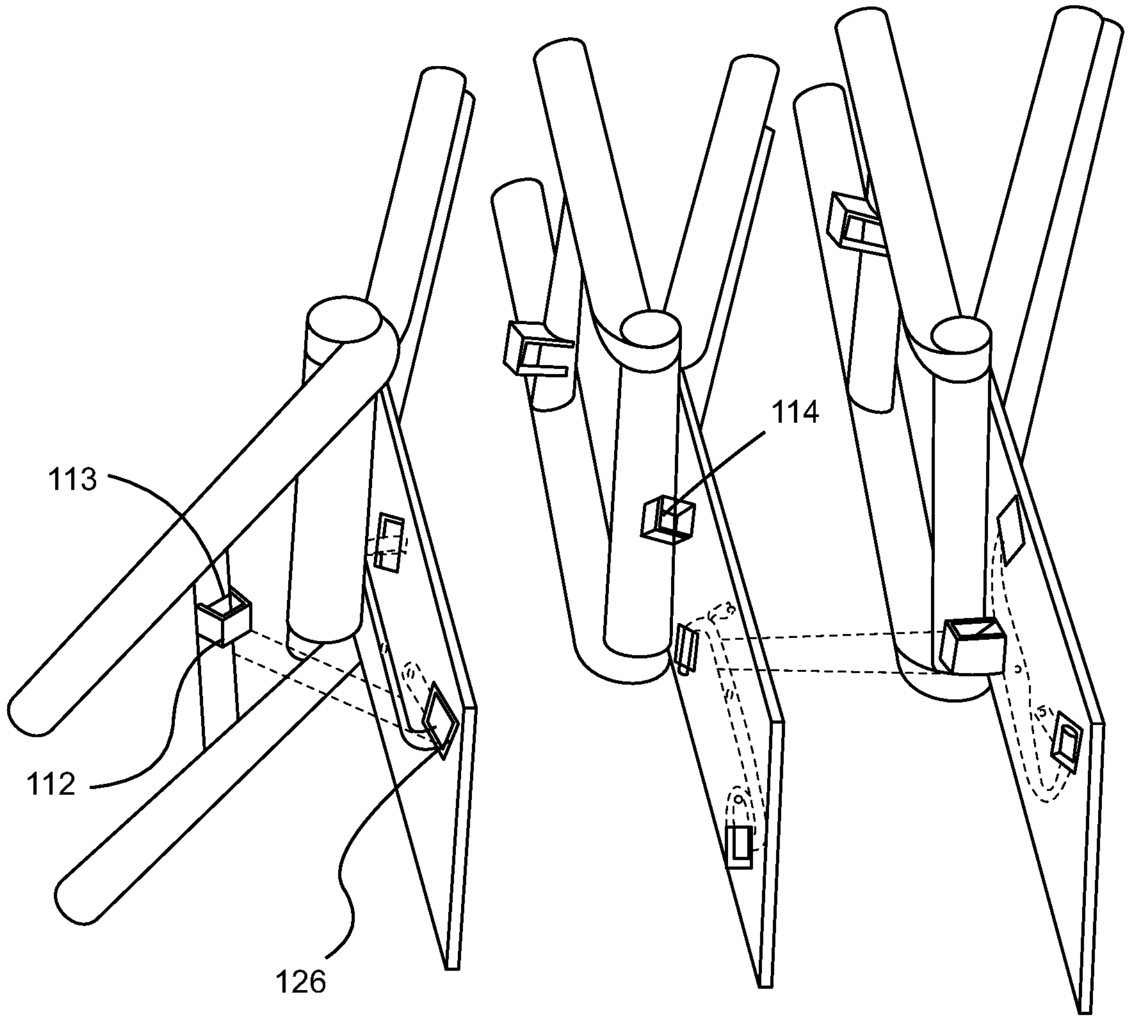
FIG. 8B is another perspective view of the latching hinge mechanism.

Referring to FIGS. 8A and 8B, the latching hinge mechanism 100 is shown. The latching hinge mechanism 100 allows the deployment of the solar sail by unfolding the solar sail in the second direction. Explained operationally, as ends of the assembly rotate away from the ends of the sail panel control module, the first segment releases when pins are pulled from a stowage catch eye, freeing the outer pair of strut segments to move free.

As the sail panel assembly rotates it imparts momentum on a free first strut segment 102, when the momentum is sufficient, the actuator reverses direction. Momentum carries the outer sail panel section 102 clockwise away from the other sail panel sections, opening a hinge 106 (arrow indicates movement). This unfolding occurs on both ends of the top strut assembly. As any of the sail panel sections hinge open (180 degrees), a deployment catch 112 presses into a corresponding deployment catch hole 126 in the latching hinge mechanism. The deployment catch flexes an arm release plate 118 away from the deployment catch hole 126, allowing a spring 120 to rotate a pivot arm 122. When the pivot arm rotates, a grab pin 124 inserts into a deployment catch eye 113. The grab pin locks the strut segment 102 open (180 degrees).

At the same time that the grab pin 124 grabs the deployment catch 112, the release pin 123 on the opposite end of the pivot arm rotates out the stowage catch eye 114. This releases the next strut segment so that this next strut segment is free to hinge open. Someone skilled in the art can implement the mechanics to the same effect of latching one strut segment open and releasing the next segment to be free to hinge open.

Figure 9:
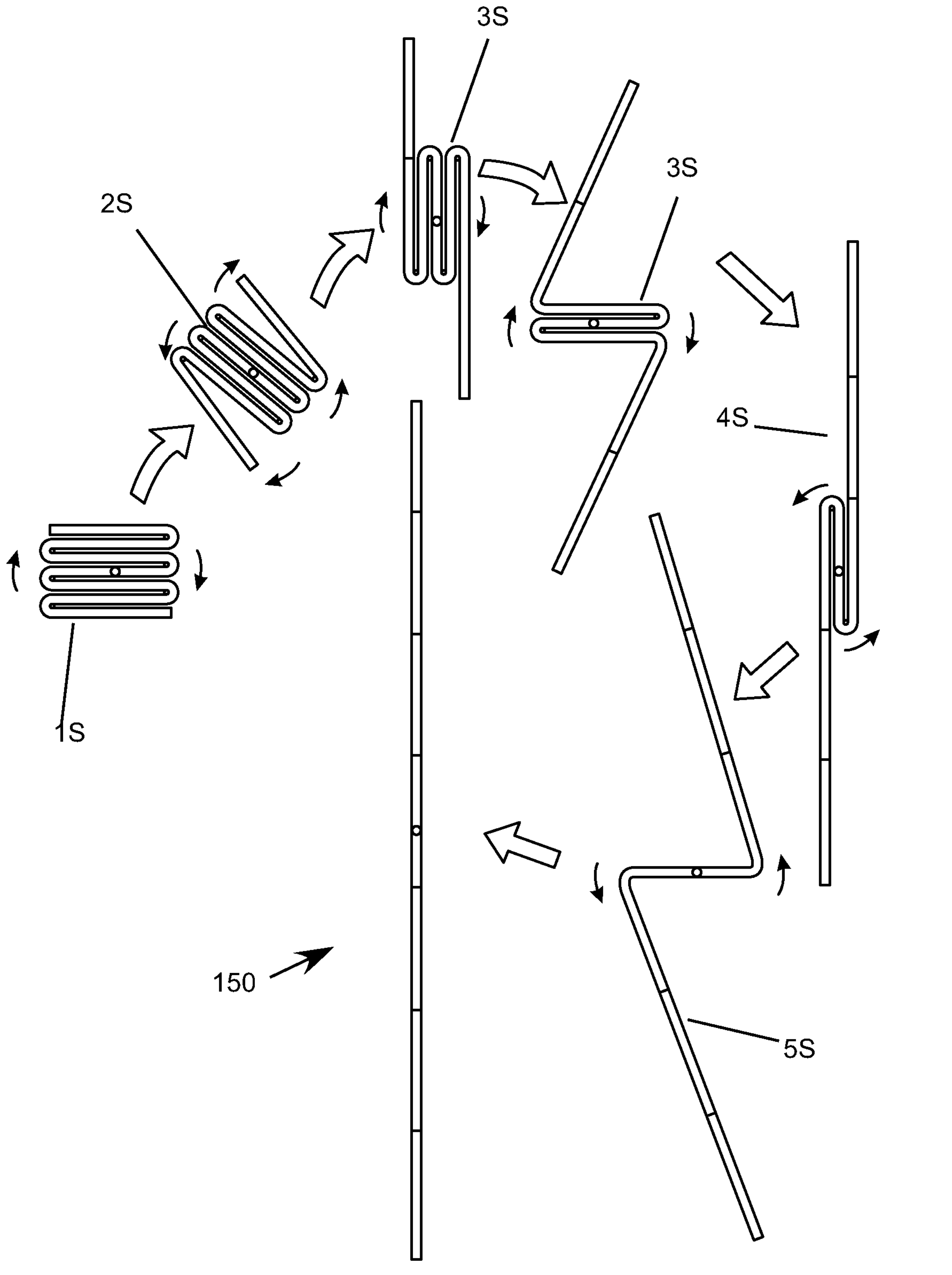
FIG. 9 is a side view of a strut segment deployment sequence.

Referring to FIG. 9, a simplified strut segment 150 deployment sequence is shown with small arrows indicating rotation of the actuator. By alternating rotation direction, the sail panel attached to the strut segment is unfolded in the second direction. Initially, the aforementioned release pin gets pulled by releasing a first segment. In a first step 1S, the folded sail is completely folded and rotating. In a second step 2S, the actuator reverses the direction of rotation and the momentum of the strut segment causes the strut segment to unfold. In a third step, the strut segment latches open (180 degrees) and the latching hinge mechanism of the next segment unlatches. In the next steps 4S and 5S the rotation direction is reversed and through alternating rotation direction the remaining strut segments fully unfold. With the strut segments fully unfolded the sail is unfolded in the second direction and the sail can then be unfolded in the first direction. Here, a certain orientation has been shown for explanatory purposes.

As aforementioned, the bottom or any intermediary struts can have a mechanical latch to hold the strut segments open (180 degrees). In general, the top struts are a more substantial structural design and body whereas the middle and bottom struts are less substantial. When the intermediary and bottom struts are simple tubes, a simple latching mechanism that locks the tubes together is sufficient.

Another method for unfolding the strut segments is to include spring loaded tension. With spring loaded hinges, rotational motion of the sail segments is not required. Spring loaded hinges can be released in a sequence, with each segment released after the preceding strut is opened (180 degrees). In another embodiment, each of the segments can be unfolded simultaneously. In yet another embodiment, a combination of sequential and simultaneous unfolding strut segments can be implemented.

Figure 10:
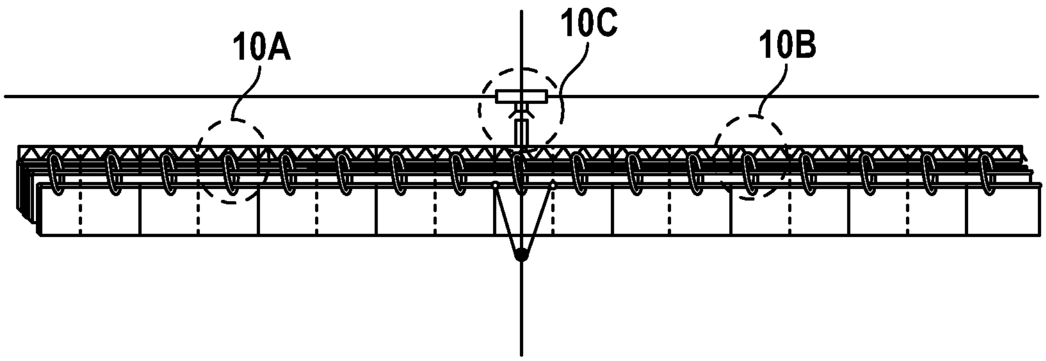
FIG. 10 is a partial plan view of the solar sail assembly with before the solar sail is unfurled.
Figure 10A:
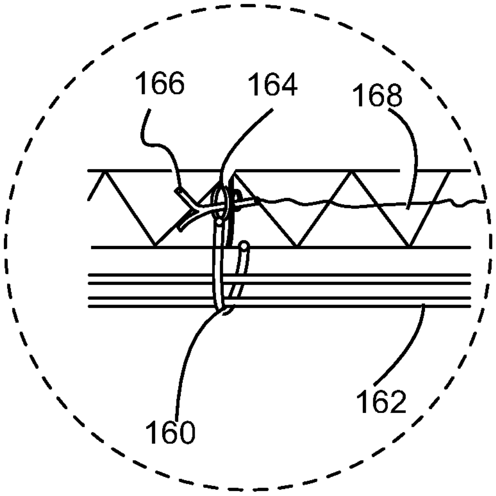
FIG. 10A is a detailed view of that shown in FIG. 10, providing a strut release pin in a first location 10A.
Figure 10B:
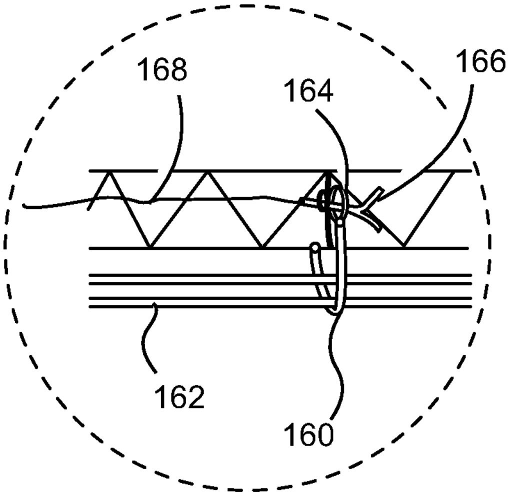
FIG. 10B is a detailed view of that shown in FIG. 10, providing a strut release pin in a second location 10B.
Figure 10C:
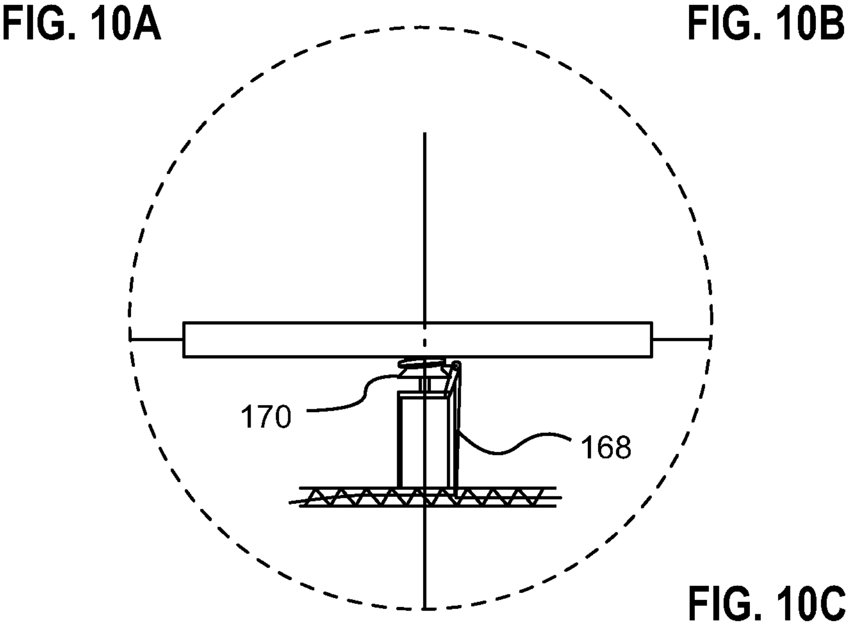
FIG. 10C is a detailed view of that shown in FIG. 10, providing a release cable attached to a strut release cable spool.

FIG. 10 illustrates a process of unfolding the sail panel in the second direction, or unfurling of the sail. Here, a sail tie cable 160 holds a bottom strut 162 and any intermediary struts in place with a strut release pin 166 through a release cable eye 164 in a first location A and a second location B. The strut release pin is attached to a release cable 168, the release cable attached to a strut release cable spool 170. Rotation of the actuator causes the strut release cable to wind onto the spool and pulls the strut release pin to release the sail tie cable and allows the sail to unfurl. Here, two locations are shown for explanatory purposes, in other embodiments a single or multiple more sail tie cables can be implemented.

Figure 11:
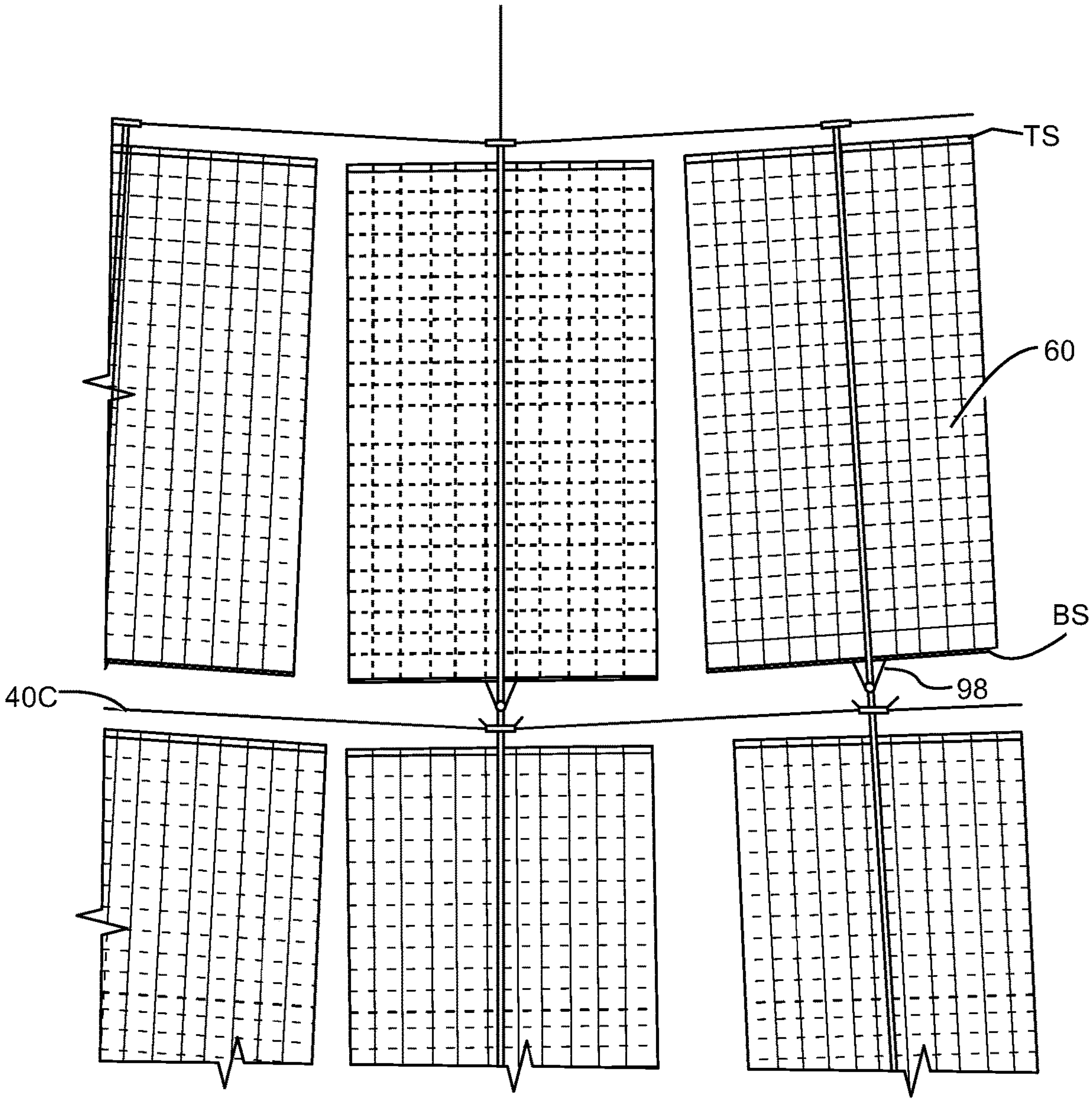
FIG. 11 is a partial plan view of the solar sails unfurled.

The sail panel can be allowed to unfurl freely or can be controlled. As aforementioned, the drag cable 94 can be employed to control the speed of the unfurling sail. As aforementioned, the tension cable adds tension to the sail during unfurling or to the fully unfurled sail. Referring to FIG. 11, a partial plan view of unfurled solar sails is shown. As shown, a tension cable 98 is connected to the bottom strut of each respective sail.

One of the many advantages of the current disclosure is the ability to launch the gyromesh spacecraft into low earth orbit and use the solar sails to increase orbital speed though the solar radiation pressure exerted on the sail from the sun. This is advantageous due to lower launch cost and without need of launching into a higher altitude. Referring to FIG. 12A through 12D, a simplified schematic illustrates an eight solar sail gyromesh spacecraft 200 wherein the plane of the drawing and this spacecraft is presumed to face the sun. As observed in the schematics, each individual solar sail can rotate along their respective radial axis from the hub or rim to the solar sail. This rotation is represented on the small circular reference angles at the end of the solar sails. This rotation exposes a different solar sail angle relative to the sun and allows the gyromesh to alter the overall solar sail spacecraft's speed and attitude. Each of the 8 solar sails can be rotated independently. Solar pressure is maximized when a sail panel is at a 0-degreee relative angle (i.e. in the plane of the drawing). Solar pressure is minimized when the sail panel is at a 90-degree relative angle.

Figure 12A:
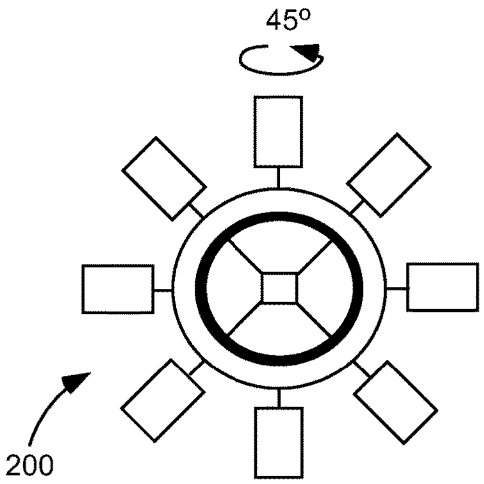
FIG. 12A is a plan view of a simplified gyromesh spacecraft with eight solar sails with each of the solar sails at a rotated angle of 45 degrees with respect a radius from the hub and facing the sun to increase centrifugal force.
Figure 12B:
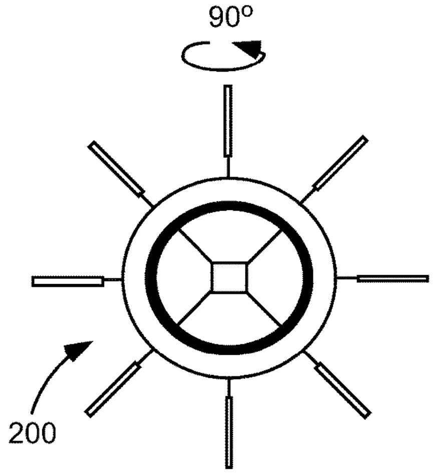
FIG. 12B is a plan view of a simplified gyromesh spacecraft with eight solar sails with each of the solar sails at a rotated angle of 90 degrees with respect to a radius from the hub and facing the sun.
Figure 12C:
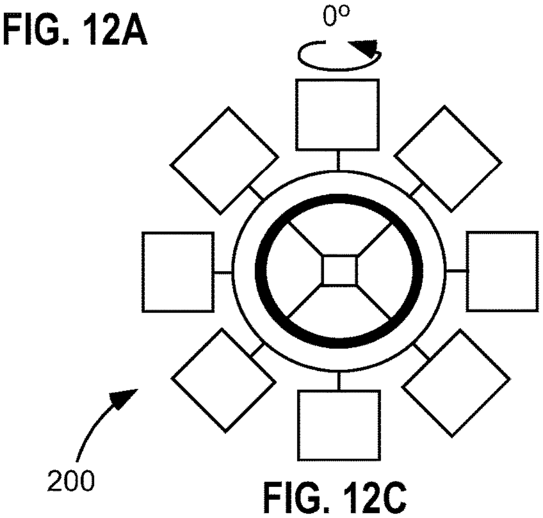
FIG. 12C is a plan view of a simplified gyromesh spacecraft with eight solar sails with each of the solar sails at a rotated angle of 0 degrees with respect to a radius from the hub and facing the sun.

FIGS. 12A through 12D show different operating modes for the solar sail panels. During deployment, as the gyromesh spacecraft and attached solar sail panels deploy outward from the rim, the rotational speed will decrease. This rotational speed can be restored by rotating a plurality of the sail panels to roughly 45 degrees, as shown in FIG. 12A. The appearance is a pinwheel. In order to increase the altitude while in earth orbit (orbit raising), the sail craft will alternate between the two modes shown in FIG. 12B and FIG. 12C. For half of the orbit, while moving towards the sun, the sail panels are turned 90 degrees to be edge-on to the sun as in FIG. 12B. This prevents the sail craft from being slowed down by light pressure from the sun. Similarly, for the other half of the orbit, while moving away from the sun, the sail panels are at 0 degrees (in the plane of the sail craft) to accelerate from the light pressure from the sun. FIG. 12C is also the typical sailing configuration after leaving earth orbit. The plane of the sail craft is typically oriented normal to the direction of the sun.

A spinning solar sail spacecraft holds the orientation of its rotational axis constant due to angular momentum. There are times when this orientation needs adjustment. Secondary forces on the sail craft may cause the orientation to change by small amounts. As the earth rotates around the sun, the sail craft attitude will not stay pointed towards the sun, and will need to be adjusted back towards the sun. After leaving earth orbit, there is a need to change the attitude relative to the sun for navigation.

Figure 12D:
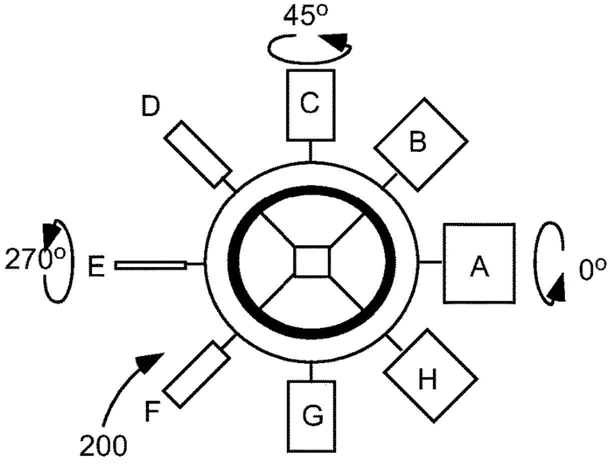
FIG. 12D is a plan view of a simplified gyromesh spacecraft with eight solar sails with each of the solar sails at a rotated angle of 90 degrees with respect to the sun.
Figure 12E:
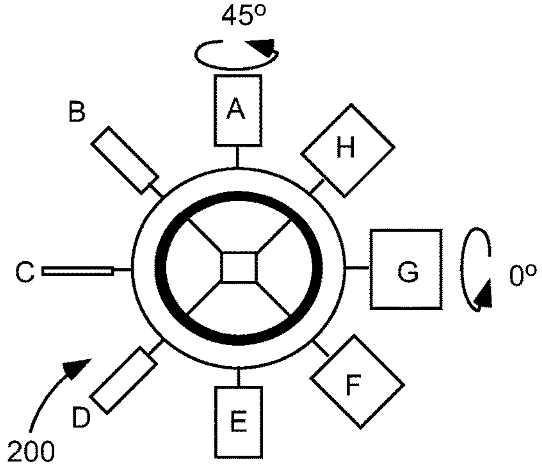
FIG. 12E is a plan view of a simplified gyromesh spacecraft with eight solar sails with the rotation of the simplified gyromesh spacecraft counterclockwise to that shown in FIG. 12D.

FIGS. 12D and 12E show the operating mode for changing the attitude of the gyromesh solar sail spacecraft. With reference to FIG. 12D as a starting point and rotation of the spacecraft counterclockwise. All of sails A, B, C, D, E, F, G and G, have their sails rotating at half the rate of rotation of the overall spacecraft. For example, for sail panel A, a 90-degree counterclockwise rotation of the spacecraft will be a 45-degree rotation of solar sail A, as shown in FIG. 12E. When the spacecraft has rotated 360-degrees, solar sail panel A will be on the right side again a full 180-degrees (equivalent to 0-degrees). For maximum correction, all of the solar sail panels can be synchronized so their respective actuators rotate the sail panels to 0-degrees or 180-degrees on the right and 90-degrees or 270-degrees on the left. The result is a center of pressure on the spacecraft to the right of its rotational axis. In the illustrated example, the resulting torque tilts the rotational axis so the top of the overall spacecraft goes below the plane of the drawing and the bottom of the spacecraft goes above the plane of the drawing. If the sail panel rotation is coordinated to be zero degrees elsewhere, the torque and resultant tilt will be in a different direction. As long as the solar sail panels rotate, the spacecraft will precess. Stopping the solar sail panel rotation will stop the spacecraft precess.

Different sets of sail panels can be performing different operating modes at the same time. For example, the outermost ring of solar sail panels could be oriented at 45 degrees to increase the rotational speed, while the next ring of solar sail panels rotates to adjust attitude of the solar sail craft, while all other rings of the solar sail panels are alternating between 0 degrees and 90 degrees for orbit raising. Indeed, any individual solar sail panel can operate in a different aforementioned mode.

Figure 13:
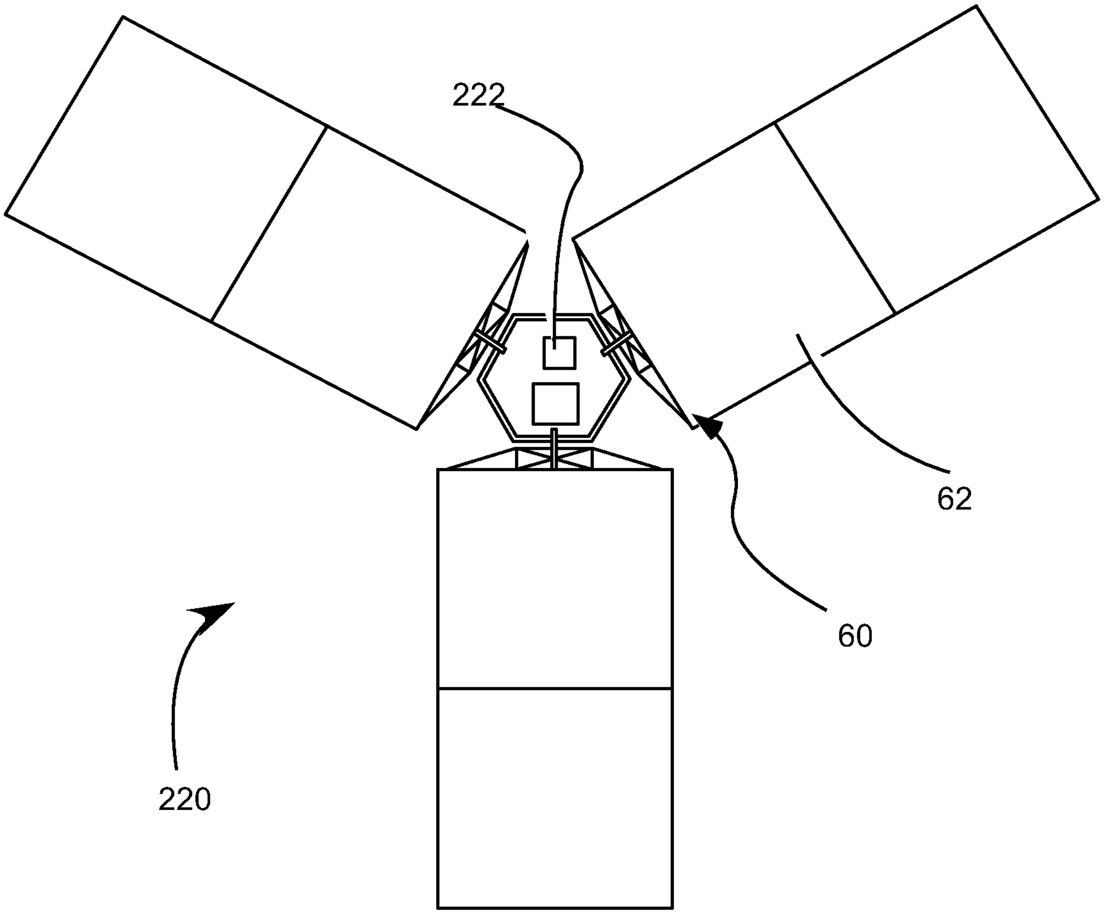
FIG. 13 is a plan view of a 3-sail spacecraft with a hub and three sail panel control assemblies.

FIG. 13 illustrates a simple 3-sail spacecraft 220 with a hub 222 and three sail panel control assemblies 60 attached to the hub 222 with solar sails 62 fully deployed.

Figure 14:
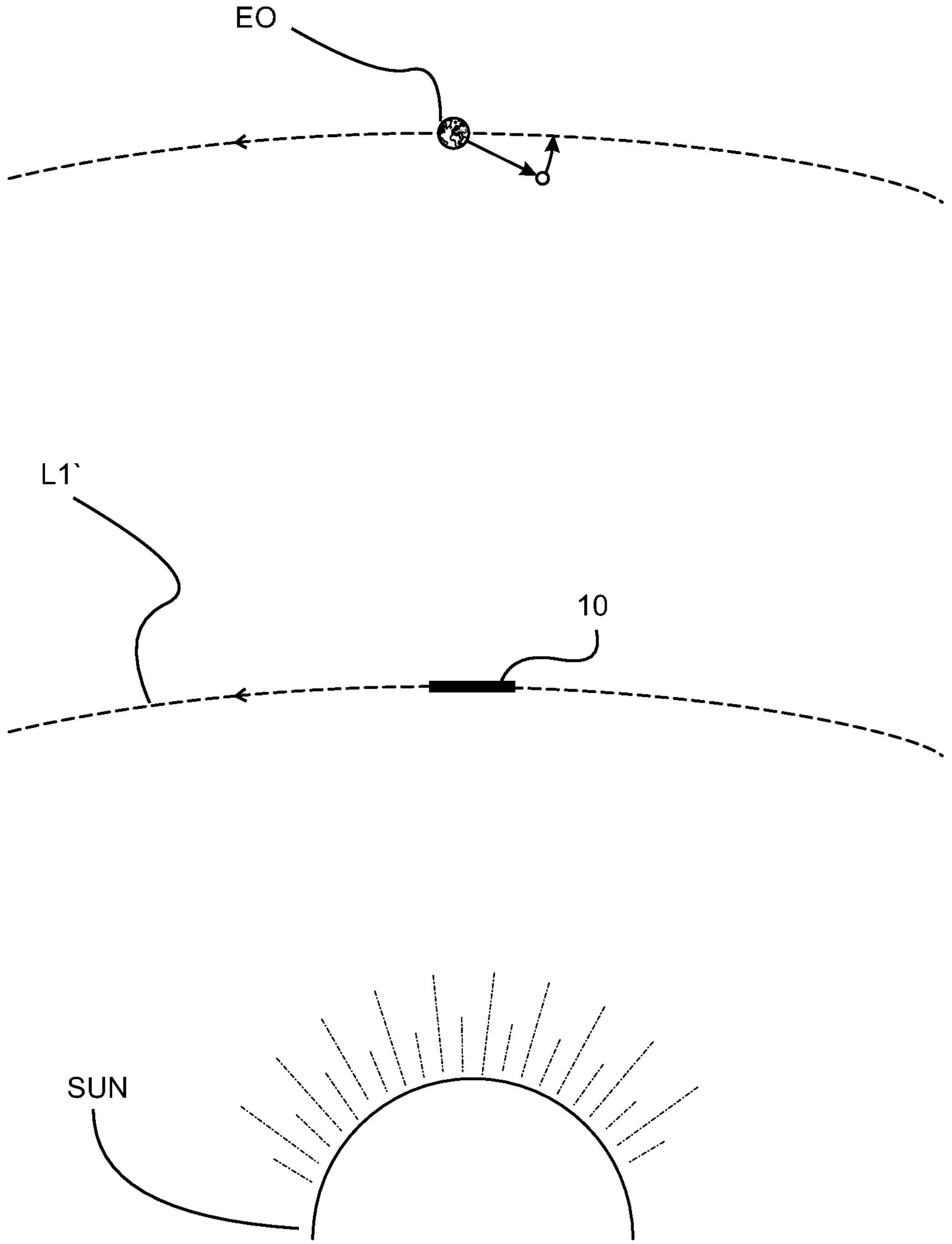
FIG. 14 is a schematic view of the gyromesh solar cell spacecraft near Lagrange 1.

The disclosed embodiments and methods have a variety of useful applications. Referring to FIG. 14, one such application illustrated is a sun shade. When the gyromesh solar sail spacecraft 10 is positioned near Lagrange One L1 between the sun SUN and earth EO the total area of the sails blocks sunlight and helps counteract the effects of trapped heat by greenhouse gasses. In such an application, near Lagrange 1, continuous solar sail pressure results in an equilibrium location with the sail facing sunward. Due to the added solar pressure of the solar induced force, the equilibrium position will be further sunward than Lagrange 1. The gyromesh solar sail spacecraft can adaptively turn sails to navigate within an acceptable range such that the gyromesh solar sail spacecraft keeps its station between the earth and sun and is not drawn too close the sun or the earth. Another related application using the same orbit is early detection of coronal mass ejection events. Generally, propellant-less space exploration, asteroid mining, cargo-tug to Mars and other planets and dead satellite cleanup are other applications.

The gyromesh solar sail assembly can be manufactured from commercially available products. The solar sail can be a reflective Mylar or other lightweight reflective material. One such material already used in aerospace for solar spacecraft is CP1 polyimide manufactured with a vapor deposition of aluminum by Nexolve. The solar sail material is preferably reflective on both sides of the film. Actuator, spools and other mechanized features are preferably light and compact. The cable material is preferably lightweight and resistant to the sun's radiation. Stranded metal cable is one suitable material. Structured ribbon cable is also a preferred structure. In general, the cables can be made from any space grade material with sufficient tensile strength for its intended load. Rigid mechanical features are preferably made from lightweight material such as carbon fiber or polymers resistant to space's atmosphere and the suns radiation.

Following the gyromesh solar sail spacecraft configuration with 528 solar sail modules as shown in FIG. 1, a practical, yet conservative estimate, for implementation is as follows below.

Regarding mass, with solar sail panels at 50' by 100' with a 2.5-micron thick film and adhesive or ripstop film the sail film mass per module is approximately 19.5 kg. The hardware including struts and hinges mass approximately 3.75 kgs. The solar sail control module including frame, electronics, motors and spools mass is about 4 kg. Each solar sail assembly mass is approximately 28 kg. The cable structure made from 3-strand 22-gauge steel mass is 7.62 g/m. 24 1-kilometer radial cables mass is 183 kg. The various circular cables from 0.3 km to 1 km weigh 249 kg. Drag and tension cables weigh 805 kg. Cable connectors weigh 42 kg. The mass of the hub and rim is 410 kg. The total mass of the gyromesh solar sail spacecraft as configured above is 16.7 metric tons. Thus, the spacecraft areal density is based on the disclosed 528 50'×100' sails configuration is 6.3 g/m$^2$. Embodiments can scale in the number of sails and configurations.

From the description of the present invention provided herein one skilled in the art can implement the method of manufacture in accordance with the present invention. While the present invention has been described in terms of particular examples, others can be implemented without departing from the invention. In some embodiments components were illustrated as separate pieces, other as monolithic bodies. It is to be understood that any particular component can be made from an assembly of parts. Further the features of certain parts can be combined with other parts to form monolithic bodies incorporating the features or functional aspects of the separate parts. In summary, the present invention is described above in terms of particular embodiments. The invention, however, is not limited to the embodiments described and depicted herein. Rather, the invention is limited only by the claims appended hereto.

What is claimed is:

1. A solar sail spacecraft comprising:

a hub;

a cable system, deployed in a plane of the solar sail spacecraft when the solar sail spacecraft is under centrifugal force, comprising:

a first plurality of cables connected to and extended radially from the hub; and a second plurality of cables, each connected to the first plurality of cables at a respective, different, radial distance from the hub and extended in a circumferential direction; and a plurality of solar sail panel assemblies, each comprising a reflective solar sail panel, wherein at least one of the plurality of solar sail panel assemblies is exclusively, rotatably, coupled to the at least one of the second plurality of cables by which a respective reflective solar sail panel of the at least one of the plurality of solar sail panel assemblies is rotatable out of the plane of the solar sail spacecraft.

2. The solar sail spacecraft of claim 1, wherein the hub comprises a rim; and wherein the first plurality of cables connected to and extended radially from the hub when the solar sail spacecraft is under centrifugal force comprises the first plurality of cables connected to and extended radially from the rim when the solar sail spacecraft is under centrifugal force.

3. The solar sail spacecraft of claim 2, wherein the rim comprises a plurality of spools around which respective ones of the first plurality of cables are wound and when being deployed are unwound to extend radially from the hub when the solar sail spacecraft is under centrifugal force.

4. The solar sail spacecraft of claim 1, wherein the plurality of solar sail assemblies each comprises a spool around which respective ones of the second plurality of cables are wound and when being deployed are unwound as the respective ones of the second plurality of cables are extended in the circumferential direction when the solar sail spacecraft is being deployed under centrifugal force.

5. The solar sail spacecraft of claim 1, wherein the at least one of the plurality of solar sail panel assemblies that is exclusively, rotatably, coupled to the at least one of the second plurality of cables comprises:

an actuator, communicably coupled with the hub and coupled to the at least one of the second plurality of cables; and a pivot arm coupled the actuator and to the respective reflective solar sail panel, the actuator to cause the pivot arm to rotate the respective reflective solar sail panel out of the plane of the solar sail spacecraft according to a communication from the hub.

6. The solar sail spacecraft of claim 5, wherein the actuator controls a roll angle of the respective reflective solar sail panel.

7. The solar sail spacecraft of claim 5, wherein the actuator controls unfurling of the respective reflective solar sail panel.

8. The solar sail spacecraft of claim 2, further comprising a thruster coupled to the rim to generate thrust by which to rotate the solar sail spacecraft about an axis normal to the plane of the solar sail spacecraft, wherein the solar sail spacecraft is thereunder centrifugal force.

9. A method of deploying a solar sail spacecraft (hereinafter "spacecraft") in orbit, the method comprising:

deploying a hub;

deploying a rim coupled to and encircling the hub, the rim having a plurality of spools around which are wound a first plurality of cables connected to the rim;

coupling a first one of a second plurality of cables encircling the rim to a first position on each of the first plurality of cables;

coupling a first plurality of solar sail panel assemblies, each having a respective reflective solar sail, to the first one of the second plurality of cables; using centrifugal force to unspool and extend the first plurality of cables a first distance in a radial direction from the rim, thereby positioning the first one of the second plurality of cables coupled to each of the first plurality of cables, and the first plurality of solar sail panel assemblies coupled to the first one of the second plurality of cables, the first distance in the radial direction from the rim;

coupling a second one of the second plurality of cables encircling the rim to a second position on each of the first plurality of cables;

coupling a second plurality of solar sail panel assemblies, each having a reflective solar sail, to the second one of the second plurality of cables;

using centrifugal force to further unspool and further extend the first plurality of cables a second distance in the radial direction from the rim, thereby positioning the second one of the second plurality of cables coupled to each of the first plurality of cables, and the second plurality of solar sail panel assemblies coupled to the second one of the second plurality of cables, the second distance in the radial direction from the rim and positioning the first one of the second plurality of cables coupled to each of the first plurality of cables, and the first plurality of solar sail panel assemblies coupled to the first one of the second plurality of cables, a third distance in a radial direction from the rim that is a sum of the first distance and the second distance.

10. The method of claim 9, wherein coupling the first plurality of solar sail panel assemblies, each having the respective reflective solar sail, to the first one of the second plurality of cables, comprises coupling the first plurality of solar sail panel assemblies, each having a respective reflective furled solar sail, to the first one of the second plurality of cables; and further comprising unfurling at least one of the respective reflective furled solar sails after coupling the first plurality of solar sail panel assemblies, each having the respective reflective solar sail, to the first one of the second plurality of cables.

11. The method of claim 9, wherein using centrifugal force to unspool and extend the first plurality of cables the first distance in the radial direction from the rim and using centrifugal force to further unspool and further extend the first plurality of cables the second distance in the radial direction from the rim comprises coupling a thruster to the rim that when in operation can increase a rotational speed of the spacecraft and thereby increase centrifugal force.

12. The method of claim 9, further comprising loading on the rim the first plurality of solar sail panel assemblies, each having a respective reflective furled solar sail;

unfurling the respective reflective furled solar sails while the first plurality of solar sail panel assemblies is loaded on the rim; and wherein coupling the first plurality of solar sail panel assemblies, each having the respective reflective solar sail, to the first one of the second plurality of cables comprises coupling the first plurality of solar sail panel assemblies, each having a respective reflective unfurled solar sail, to the first one of the second plurality of cables.

13. The method of claim 9, wherein the first and second plurality of sail panel assemblies each comprises a spool;

wherein coupling the first and second plurality of solar sail panel assemblies, each having a respective reflective solar sail, to the respective first and second ones of the second plurality of cables, comprising winding the respective first and second ones of the second plurality of cables around each sail panel assembly spool; and wherein using centrifugal force to unspool and extend the first plurality of cables the first and second distances in the radial direction from the rim causes the respective ones of the second plurality of cables to unspool from each sail panel assembly spool and extend in a circumferential direction.

14. The method of claim 10, further comprising orienting the at least one unfurled respective reflective solar sail relative to solar radiation to increase rotational speed of the spacecraft.

* * * * *

UNITED STATES PATENT AND TRADEMARK OFFICE

CERTIFICATE OF CORRECTION

PATENT NO. : 11,958,637 B2
APPLICATION NO. : 17/238200
DATED : April 16, 2024
INVENTOR(S) : Timothy N. Sippel It is certified that error appears in the above-identified patent and that said Letters Patent is hereby corrected as shown below:

On the Title Page

Name of Assignee at Column 1, Item (73) needs to be corrected from "Geoshade Corporal" to "Geoshade Corporation."

Signed and Sealed this
Twenty-third Day of July, 2024

Katherine Kelly Vidal

Katherine Kelly Vidal
*Director of the United States Patent and Trademark Office*